United States Patent [19]

Nassar

[11] 4,330,562

[45] May 18, 1982

[54] INTERMEDIATE MOISTURE STABILIZED CHUNKY FOOD PRODUCT AND METHOD

[75] Inventor: Abdalla E. Nassar, Artesia, Calif.

[73] Assignee: CHB Foods, Inc., Terminal Island, Calif.

[21] Appl. No.: 197,069

[22] Filed: Oct. 15, 1980

Related U.S. Application Data

[63] Continuation of Ser. No. 108,573, Dec. 31, 1979, abandoned, which is a continuation of Ser. No. 919,123, Jun. 26, 1978, abandoned.

[51] Int. Cl.³ .................................................. A23K 1/10
[52] U.S. Cl. ...................................... 426/310; 426/335; 426/532; 426/623; 426/630; 426/635; 426/805
[58] Field of Search ................. 426/302, 321, 310, 89, 426/96, 335, 623, 532, 630, 805, 635

[56] References Cited

U.S. PATENT DOCUMENTS

| | | | |
|---|---|---|---|
| 3,615,647 | 10/1971 | Kassens | 426/96 |
| 3,974,296 | 8/1976 | Burkwall | 426/805 X |
| 4,001,449 | 1/1977 | Reardanz et al. | 426/805 X |
| 4,022,915 | 5/1977 | Zukerman | 426/805 X |
| 4,104,407 | 8/1978 | Stringer et al. | 426/805 X |

Primary Examiner—R. B. Penland
Attorney, Agent, or Firm—Neuman, Williams, Anderson & Olson

[57] ABSTRACT

A method of producing an extruded, microbiologically stable, intermediate moisture food product having a moisture content between about 25 and 35% by weight, a protein content between about 15 and 35% by weight, an antimycotic agent and a water activity ($A_w$) between about 0.75 and 0.85, which has an extended shelf life when stored in moisture-proof packages and does not require hermetic packaging or refrigeration.

17 Claims, 1 Drawing Figure

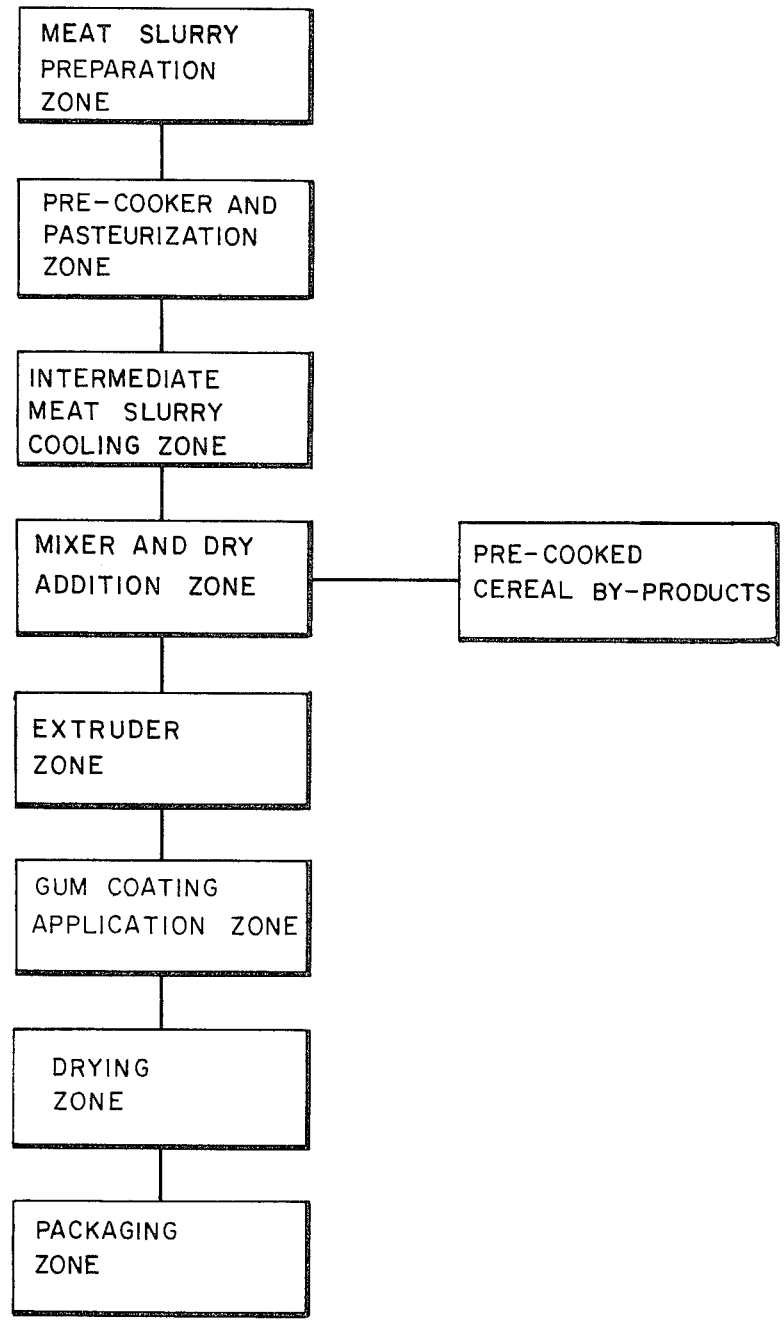

INTERMEDIATE MOISTURE STABILIZED CHUNKY FOOD PRODUCT AND METHOD

This is a continuation of application Ser. No. 108,573 filed Dec. 31, 1979, now abandoned, which is a continuation of application Ser. No. 919,123 filed June 26, 1978, now abandoned.

BACKGROUND OF THE INVENTION

1. Field of the Invention

This invention relates to high protein, microbiologically stable, intermediate moisture food products in chunk form which are particularly useful as a pet or animal food.

2. Description of the Prior Art

Pet food products in general are divided into three general classes. They include the so-called dry pet food products, usually in meal or granular form which contain less than 15% moisture, most commonly about 10% moisture. The dry products are packaged and stored in bags and are resistant to spoilage if kept dry.

The high moisture products containing 65–75% moisture are generally sold as canned products and require retorting (cooking) in the canning operation to prevent spoilage.

The more recent intermediate moisture food products are those which contain between about 15 and 45% moisture. These products are in general stabilized by the use of soluble additives to produce a water activity ($A_w$) sufficient to prevent bacteriological growth and consequent spoilage of the food products when packaged in moisture impermeable, flexible bags or wrappings. The bacterial growth and consequent product spoilage is precluded by additives such as sugar or low molecular weight polyhydroxy alcohols, including, for example, propylene glycol and glycerol. While the use of these soluble additives is effective to control conventional bacteriological growth, it is also necessary to control fungi, yeast and mold which can proliferate on systems which have been stabilized against bacteriological attack. The control of such molds, yeast and fungi is achieved by the addition of an antimycotic agent such as, for example, potassium sorbate, or the like.

Patents relating to the use of sugar stabilizers and antimycotic agents for intermediate moisture pet foods include Burgess et al., U.S. Pat. No. 3,202,541, No. 3,482,985, No. 3,615,652; Buck et al., U.S. Pat. No. 3,653,908, No. 3,489,574 and No. 3,516,838. Zukerman, U.S. Pat. No. 4,022,915, describes an intermediate moisture food product stabilized by the use of 5 to 15% polyhydroxy alcohol. The Zukerman method involves the hot processing and expansion of a mixture of cooked farinaceous and proteinaceous materials admixed with polyhydroxy alcohol and extruded under pressure to produce a low bulk density product which is formed into chunks, coated with fat and packaged.

SUMMARY OF THE INVENTION

The present invention relates to an improved method of preparing an intermediate moisture, proteinaceous food product preferably having a moisture content of from about 25 to 35% (by weight), water activity ($A_w$) of from about 0.75 to 0.85, characterized by microbiological stability under ordinary shelf storage conditions, more particularly when packaged in essentially moisture impermeable, flexible packaging such as plastic (polyethylene) bags or coated transparent plastic film packaging.

More particularly, the invention relates to a method for preparing a microbiologically shelf stable, extruded proteinaceous food product having a moisture content of between about 25 and 35% by weight and a water activity ($A_w$) of between about 0.75 and 0.85 which comprises:

(a) cooking a slurry of water, meat, fat, salt, antimycotic agents and a polyhydroxy alcohol at a temperature of at least 185° F. for a period of at least 15 minutes to pasteurize the admixture and form a homogeneous, pumpable admixture;

(b) cooling the admixture to less than about 100° F.;

(c) adding the cooled slurry to a dry admixture of particulate proteinaceous vegetable material and cereal grain material components and blending the same to produce a homogeneous blend containing between about 25 and 35% by weight moisture at a temperature below about 100° F.;

(d) extruding the blended product through a die of predetermined diameter and comminuting the extruded stream of blended product into chunks of predetermined size and shape;

(e) coating the chunks of extruded product with an aqueous solution of vegetable gum and antimycotic agent; and (f) passing the coated chunks through a drying zone to dry the applied coating to a shiny finish.

The product is characterized by having a total protein content of from about 15 to 35 weight percent, preferably from 20 to 30 weight percent. The protein component of the product is derived from both animal and vegetable sources. Animal or "meat protein" sources include meats or meat by-products and includes poultry and fish.

The vegetable protein source components includes proteinaceous oil seed vegetable materials of a high protein content, including from that known group, soybean derived materials such as soy flour (full fat or defatted), defatted or full fat dehulled soya grits, peanut meal, cottonseed meals and rapeseed meals or the like. These vegetable proteins, in addition to the protein component, contain a sizable amount of carbohydrate. The vegetable protein components are preferably in a partially processed particulate form, i.e., grits, flakes, flours or small chunks. Textured vegetable proteins are also usable. The vegetable protein component used should be essentially free of adventitious contamination (i.e., bacteria, etc.) since it is blended into the product after the pasteurization step which is applied only to the meat slurry. Protein concentrates or isolates which are derived from vegetable proteins may also be used to supplement or replace a minor part (i.e., 10% or less) of the proteins listed above. Since these concentrates are frequently in a liquid or semi-liquid form and have a great part of their naturally occuring carbohydrate and fiber component removed, they are a more concentrated source of protein, but their processing results in a product having less body. Accordingly, the natural solid meat or vegetable protein materials are preferred in this invention since they provide firmness and integrity to the product. Toasted soya grits such as defatted and dehulled flakes or grits (40/80 mesh) which are relatively free from bacterial contamination are particularly preferred. These soya grits generally contain about 50% protein (dry basis) and about 10% moisture and the balance carbohydrate. Vegetable proteins are preferably used to provide up to 85–95% of the protein in the final product.

Partially textured vegetable protein materials such as those produced by the Levinson process described in U.S. Pat. No. 2,162,729 and sold by the H. B. Taylor Division of National Can Corporation under the name TEXTRASOY are particularly useful. Another useful product described by Levinson and Basa in U.S. Pat. No. 3,966,977 is a textured vegetable protein material which has an enhanced protein content, the texture and mouth feel of meat and contains polyhydroxy alcohol stabilizers in a soft, relatively high moisture product.

The fats or oil components of the product made herein may be of animal or vegetable origin such as lard, corn oil or the like, and in part contributed by the meat. Fat is present in amounts of from about 3–10%.

The product contains carbohydrates in amounts of from 20 to 40%, preferably 25 to 35%, by weight. The carbohydrates include sugar, which has the dual function of acting as a nutrient carbohydrate, as well as a preservative. The carbohydrates as starch are as a part of the vegetable protein material (soya grits) and in part by the cereal grain component. The cereal grain components are preferably partially processed materials such as rolled or cracked grains which have been heat treated, i.e., toasted. Particularly useful are breakfast cereal by-products or waste fines from the manufacture of breakfast cereals. They are usually derived from corn, wheat, rice or oats and often contain as much as 15 to 20% by weight of sugar, as well as starch. While sugar is useful as a stabilizer for the semi-moist compositions of this invention, the use of sugar as such should be limited in the diet of pets. Thus, the sugar employed is preferably in amounts from 2% up to, but less than 10%, preferably 2% to 6% by weight, and preferably less than the amount of polyhydroxy alcohol used as a bacteriostatic preservative.

The polyhydroxy alcohols employed to prevent bacterial growth are used in amounts of from 5 to 15%, preferably 5 to 10%. The stability of the product is measured in terms of water activity ($A_w$) and generally products which have an $A_w$ of 0.75 to 0.85 are sufficiently stable for shelf storage without canning or refrigeration. The total water activity is the composite effect obtained from solubles such as polyhydroxy alcohols, sugars such as sucrose, and salt. The preferred polyhydroxy alcohols are edible, food grade materials such as propylene glycol, glycerol, sorbitol or the like. As noted above, sugars may be used in lieu of a portion of the polyhydroxy alcohol, i.e., less than half.

Antimycotic agents are employed to control and prevent the growth of yeast, mold or fungus on or in the stabilized products. Stabilization of the product with sugars and/or polyhydroxy alcohols while adequate to prevent bacterial attack, must be supplemented with antimycotic or antifungal materials such as potassium sorbate or calcium propionate in amounts of from about 0.1 to about 0.2 or 0.4, or more, by weight of product.

The products of the present invention are extruded through a die but are generally of normal density, i.e., not expanded or popped. The extrudate emerging in a continuous stream from the extrusion die head is cut into segments of predetermined length (i.e., ½ to 1 inch). These chunk forms, however, while having adequate integrity for handling and processing as stabilized, finished products, are preferably further treated in accord with the process of the present invention to provide a coating on the chunks which acts to improve their integrity and appearance. The coating applied is an aqueous vegetable gum solution, preferably of gum arabic (acacia), although other gums may be used, such as locust bean gum, or the like. The applied gum coating provides the chunk products with a shiny barrier coat which not only helps to prevent crumbing of the surface, but also aids in holding the chunks together and to maintain the initial predetermined moisture level in the chunks. The gum solution at 5–10% solids is heated to 165°–180° before application and contains a small amount of antimycotic agent (0.2 to 0.3%) to inhibit surface growth of mold or yeasts.

The gum coating may be applied by a variety of means including spraying or pan coating and tumbling to provide an even coating over essentially the entire surface of the chunks. The coating contributes 4 to 6% of the chunk weight.

After coating with the gum solution, the chunks are dried in an oven, preferably on a belt which passes through a gas fired, forced hot air circulating oven for a time and at a temperature sufficient to drive off the water component of the coating. When dry, the chunks have a shiny appearance, are not tacky to the touch, do not adhere together, and are essentially at ambient room temperature or a little above.

The dried coated chunks are then packaged in flexible packaging materials such as bags made of polyethylene film or coated cellophane or multi-ply laminated papers or bags. The flexible packaging materials are preferably relatively moisture impermeable and thus maintain the predetermined moisture content of the product which is required for the desired soft texture. The packaged products are shelf stable or, more particularly, are microbiologically stable and do not support bacterial or yeast, mold or fungal growth even after the package is opened. The coating is particularly useful in that it acts as a barrier coat which helps to prevent the chunks from drying out or absorbing atmospheric moisture when the package is opened at the time of use or the bag is imperfectly sealed.

While the herein described products are essentially neutral, i.e., a pH of 6–8, the pH of the product may be adjusted for a cat food to a pH in the range of 5 to 6 by the addition of food grade acids such as phosphoric or acetic acids.

BRIEF DESCRIPTION OF THE DRAWINGS

Reference is made to the attached drawing wherein a flow sheet of the method described herein is illustrated schematically by a series of block diagrams representing various processing zones. The steps (zones) illustrated include:

1. Meat slurry preparation zone.
2. Meat pre-cooker and pasteurization zone.
3. Intermediate meat slurry cooling zone.
4. Mixer and dry addition (cereals and vegetable protein) zone.
5. Extrusion zone.
6. Gum coating application zone.
7. Drying zone.
8. Packaging zone.

The first processing step involves the formation of a "meat slurry", namely, mixing meat or meat by-products with polyhydroxy alcohols and other solubles and minor ingredients, including flavors, colors, salt, antimycotics, vitamins, fats and the like with water. The objective is to provide thorough mixing as well as penetration of stabilizing solubles into the meat component which, by experience, is the most susceptible to spoilage by virtue of normal contamination with bacteria.

The blended slurry is then, or simultaneously with mixing, heated in a "pre-cooker" zone (which may be the same vessel), with agitation, to pasteurizing temperatures above 185° F., preferably 185°–195° F. for a period sufficient to effect pasteurization, i.e., 15 to 20 or 25 minutes. The final pasteurized hot product in a pumpable, liquid slurry form, i.e., 40–60% free liquid (50–70% total moisture) is pumped to a cooling zone and permitted to cool to ambient conditions, i.e., generally less than 100° F., preferably 50°–70° F.

A mixture of comminuted vegetable protein materials such as toasted soya grits is blended together with the particulate cereal products, i.e., breakfast cereal fines, and the cooled, pasteurized meat slurry is added to the dried particulate blend and further mixed to form a homogeneous admixture having a moisture content of 25 to 35%, preferably 25–32% moisture at temperatures of 50°–75° F.

The homogeneous mixture is then passed to an extrusion zone and forced through an extrusion die to form an extrudate stream of the desired dimensions, such as about ½ to 1 inch diameter. The temperature may rise slightly in the extrusion step, i.e., from 70°–75° F. to 80° or 85° F., but there is no heat applied to the mix during extrusion, there is no expansion of the product as it emerges from the die, and the product is of the normal density of its components. As the extrudate emerges from the die, it is cut into convenient lengths by a rotary knife so that discrete chunks of about ½ to ¾ inch "diameter" are obtained. The die orifice can be circular, but other shapes such as cross, oval, square, may be used.

The chunks of extrudate are then further processed by gum coating, drying and packaging as described above.

For a more complete understanding of the present invention, reference is made to the following specific embodiments.

DESCRIPTION OF THE PREFERRED EMBODIMENTS

EXAMPLE 1

1. Meat Slurry Preparation a. Cooking

The following ingredients are mixed in a 250 gallon, round bottom, steam-jacketed stainless steel cooking kettle, equipped with a Lightening mixer and an automatic, temperature controller.

| | Ingredients | Pounds | % Slurry | % Total |
|---|---|---|---|---|
| 1. | Water | 218 | 38.93 | 18.00 |
| 2. | Meats (By-Products) | 125 | 22.32 | 10.33 |
| 3. | Propylene Glycol | 100 | 17.86 | 8.26 |
| 4. | Animal Fat (or Veg. Oil) | 75 | 13.40 | 6.20 |
| 5. | Iodized Salt | 12 | 2.14 | 1.00 |
| 6. | Caramel Color | 10½ | 1.88 | .86 |
| 7. | Defluorinated Phosphate[(1)] | 6 | 1.07 | .50 |
| 8. | Iron Oxide (Red) | 2½ | 0.45 | .21 |
| 9. | Potassium Sorbate | 2 | 0.36 | .17 |
| 10. | Calcium Propionate | 2 | 0.36 | .17 |
| 11. | Beef Flavoring | 2 | 0.36 | .17 |
| 12. | Liquid Smoke | 2 | 0.36 | .17 |
| 13. | Vitamin Premix | 2½ | 0.45 | .21 |
| 14. | Titanium Dioxide | ½ | 0.09 | .04 |
| | TOTAL SLURRY | 560 lbs. | 100% | 46.29% |

[(1)]A calcium phosphate. Mono or dicalcium phosphate may be used as a source of calcium and phosphorus.

The above meat slurry is cooked and pasteurized with continuous agitation at temperatures between 185° and 195° F., from between about 15 and 25 minutes.

b. Cooling

The hot pasteurized meat slurry is then pumped from the kettle to a cooling station where the temperature drops to between about 50° to 70° or 75° C. (room temperature).

2. Dry Mix

The following dry ingredients are dry blended in a Baker-Perkins mixer of about 1500 to 1800 pound capacity.

| | Ingredients | Pounds | % Dry | % Total |
|---|---|---|---|---|
| 1. | Toasted Soy Grits, 40/80 Mesh | 400 | 61.54 | 33.05 |
| 2. | Toasted Cereals* (Cereal By-Products) | 250 | 38.46 | 20.66 |
| | TOTAL DRY MIX | 650 lbs. | 100% | 53.71 |

*Toasted cereals or bakery by-products chiefly corn and wheat containing 15 to 20% sugar.

3. Total Batch Preparation a. The cool meat slurry is pumped over the dry mix in the Baker-Perkins mixer and the entire mixer contents are thoroughly mixed together for between about 15 and 20 minutes to produce a homogeneous blend containing between about 25 and 32% by weight moisture at a temperature of about between 50° and 75° F. The total mix weight was 1210 lbs.

4. Extrusion

The batch of the blended admixture is passed into a compression and an extrusion chamber of a Bonnot Extruder and through a ½ inch die. The extrudate is cut into ⅜–⅝ inch lengths by a rotary knife placed at the die face. The extruded product contains between 25 and 32% moisture at a temperature between about 65° and 75° F.

5. External Gum Application

A 10% aqueous gum acacia solution containing from 0.20 and 0.30% potassium sorbate as a mold inhibitor is heated to about between 160° and 180° F. and is sprayed on the surfaces of the chunks of extruded product at a rate of about between 2 and 4% of the finished product. The chunks are tumbled during spraying to provide an even coating.

The application of gum acacia solution to the surface of the chunks of extruded product provides a very thin, uniform external film after drying. The external film:

a. improves the product integrity and minimizes the fines generated in handling;

b. retards moisture migration from inside the chunk to the surrounding space inside the package;

c. contributes a shiny and more meaty appearance to the product; and d. produces a desired meat-like product texture.

6. Drying Process

Immediately after the application of the gum coating, the product is passed through a drying zone (70°–80° F.) to dry the coating and form an external film. The product temperature after the drying step is still essentially at ambient room temperature.

7. After drying the product is ready for packaging in sealed, plastic (polyethylene film) bags The final food product has a moisture content of about 31%; protein, 22%; fat, 8.3%; propylene glycol, 8.3%; sugar, 3.6%; and carbohydrate (total), 29%.

EXAMPLE 2

1. Meat Slurry Preparation a. Cooking

The following ingredients are mixed in a 250 gallon, round bottom, steam-jacketed stainless steel cooking kettle, equipped with a Lightening mixer and an automatic temperature controller.

|  | Ingredients | Pounds | % Slurry | % Total |
|---|---|---|---|---|
| 1. | Water | 100 | 16.89 | 7.90 |
| 2. | Meats (By-Products) | 300 | 50.68 | 23.70 |
| 3. | Propylene Glycol | 100 | 16.89 | 7.90 |
| 4. | Animal Fat (or Veg. Oil) | 50 | 8.45 | 3.95 |
| 5. | Iodized Salt | 13 | 2.20 | 1.03 |
| 6. | Caramel Color | 10 | 1.69 | .79 |
| 7. | Defluorinated Calcium Phosphate | 6 | 1.01 | .50 |
| 8. | Iron Oxide (Red) | 2½ | 0.42 | .20 |
| 9. | Potassium Sorbate | 2 | 0.34 | .16 |
| 10. | Calcium Propionate | 2 | 0.34 | .16 |
| 11. | Beef Flavoring | 2 | 0.34 | .16 |
| 12. | Liquid Smoke Flavor | 2 | 0.34 | .16 |
| 13. | Vitamin Premix | 2 | 0.34 | .16 |
| 14. | Titanium Dioxide | ½ | 0.08 | .04 |
|  | TOTAL SLURRY | 592 | 100% | 46.72 |

The above meat slurry is cooked and pasteurized with continuous agitation at temperatures between 185° and 195° F. from between about 15 and 25 minutes.

b. Cooling

The hot pasteurized meat slurry is then pumped from the kettle to a cooling station where the temperature is permitted to fall to between about to to 70° or 75° F.

2. Dry Mix

The following dry ingredients are dry blended in a Baker-Perkins mixer of about 1500 to 1800 pound capacity.

|  | Ingredients | Pounds | % (Dry) | % (Total) |
|---|---|---|---|---|
| 1. | Toasted Soy Grits, 40/80 Mesh | 300 | 44.44 | 23.68 |
| 2. | Toasted Cereals* (Bakery By-Products) | 375 | 55.56 | 29.59 |
|  | TOTAL DRY MIX | 675 | 100% | 53.27 |

*Toasted cereals/bakery by-products contain 15–20% sugar.

3. Total Batch Preparation

The cool meat slurry is pumped over the dry mix in the Baker-Perkins mixer and the entire mixer contents are thoroughly mixed together for between about 15 and 20 minutes to produce a homogeneous blend containing between about 25 and 32% by weight moisture at a temperature of about between 50° and 75° F. (Total weight approximately 1267 lbs.)

4. Extrusion

The batch of the blended admixture is passed into a compression and an extrusion chamber of a Bonnot Extruder and through a ½ inch die. The extrudate is cut into ⅜–⅝ inch lengths by a rotary knife placed at the die face. The extruded product contains between 25 and 32% moisture at a temperature between about 65° and 75° F.

5. External Gum Application

A 10% aqueous gum acacia solution containing from 0.20 and 0.30% potassium sorbate as a mold inhibitor is heated to about between 160° and 180° F. and is sprayed on the surfaces of the chunks of extruded product at a rate of about between 2 and 4% of the finished product. The chunks are tumbled during spraying to provide an even coating.

The application of gum acacia solution to the surface of the chunks of extruded product provides a very thin, uniform external film after drying.

6. Drying Process

Immediately after the application of the gum coating, the product is passed through a drying zone (70°–80° F.) to dry the coating and form an external film. The product temperature after the drying step is still essentially at ambient room temperature.

7. After drying the product is ready for packaging in sealed, plastic (polyethylene film) bags The final food product has a moisture content of about 30%; protein, 21%; fat, 8%, propylene glycol, 8%; sugar, 5.3%, carbohydrate (total) 31%.

The packaged product of Example 2 was held on shelf-storage (room temperature) for about 1½ years and then tested to determine the condition of the product insofar as stability (microbiological) was concerned. The following results were obtained:

| Total Plate Count: | 7300/gram |
|---|---|
| Yeast, Mold and Fungi Count: | <10/gram |
| Moisture Content: | 33.2% |
| Water Activity ($A_w$): | 0.85 |

From the foregoing, it was concluded that the product of the process has excellent long-term shelf stability from a microbiological viewpoint.

EXAMPLE 3

1. Meat Slurry Preparation a. Cooking

The following ingredients are mixed in a 250 gallon, round bottom, steam-jacketed stainless steel cooking kettle, equipped with a Lightening mixer and an automatic temperature controller.

|  | Ingredients | Pounds | % (Of Total Products) |
|---|---|---|---|
| 1. | Water | 218 | 18.02 |
| 2. | Meats (By-Products) | 125 | 10.33 |
| 3. | Propylene Glycol | 100 | 8.26 |
| 4. | Animal Fat (or Veg. Oil) | 75 | 6.20 |

-continued

| | Ingredients | Pounds | % (Of Total Products) |
|---|---|---|---|
| 5. | Iodized Salt | 12 | 0.99 |
| 6. | Caramel Color | 10 | 0.83 |
| 7. | Defluorinated Calcium Phosphate | 6 | 0.05 |
| 8. | Iron Oxide (Red) | 2½ | 0.21 |
| 9. | Potassium Sorbate | 2 | 0.17 |
| 10. | Calcium Propionate | 2 | 0.17 |
| 11. | Beef Flavoring | 1½ | 0.12 |
| 12. | Liquid Smoke Flavor | 3 | 0.25 |
| 13. | Vitamin Premix | 2½ | 0.21 |
| 14. | Titanium Dioxide | ½ | 0.04 |
| | TOTAL SLURRY | 560 lbs. | 46.28% |

The above meat slurry is cooked and pasteurized with continuous agitation at temperatures between 185° and 195° F. from between about 15 and 25 minutes.

b. Cooling

The hot pasteurized meat slurry is then pumped from the kettle to a cooling station where the temperature is permitted to fall to between about 50° and 70° or 75° F.

2. Dry Mix

The following dry ingredients are dry blended in a Baker-Perkins mixer of about 1500 to 1800 pound capacity.

| Ingredients | Pounds | % |
|---|---|---|
| 1. Toasted Soy Grits | 500 | 41.32 |
| 2. Cereal By-Products (15–20% sugar) | 150 | 12.40 |
| Total Dry Mix | 650 | 53.72 |
| Total Meat Slurry | 560 | 46.28 |
| Total Batch | 1210 Lbs. | 100% |

3. Total Batch Preparation

The cool meat slurry is pumped over the dry mix in the Baker-Perkins mixer and the entire mixer contents are thoroughly mixed together for between about 15 and 20 minutes to produce a homogeneous blend containing between about 25 and 32% by weight moisture at a temperature of about between 50° and 75° F.

4. Extrusion

The batch of the blended admixture is passed into a compression and an extrusion chamber of a Bonnot Extruder and through a ½ inch die. The extrudate is cut into ⅜–⅝ inch lengths by a rotary knife placed at the die face. The extruded product contains between 25 and 32 percent moisture at a temperature between about 65° and 75° F.

5. External Gum Application

A 10% aqueous gum acacia solution containing from 0.2 and 0.3% potassium sorbate as a mold inhibitor is heated to about between 160° and 180° F. and is sprayed on the surfaces of the chunks of extruded product at a rate of about between 2 and 4% of the finished product. The chunks are tumbled during spraying to provide an even coating.

The application of gum acacia solution to the surface of the chunks of extruded product provides a very thin, uniform external film after drying.

6. Drying Process

Immediately after the application of the gum coating, the product is passed through a drying zone (70°–80° F.) to dry the coating and form an external film. The product temperature after the drying step is still essentially at ambient room temperature.

7. Packaging

After drying, the product is ready for packaging in sealed, plastic (polyethylene film) bags.

The final coated food product after drying contained about 31% moisture; protein, 29%; fat, 8.3%, propylene glycol, 8.3%; sugar, 2.1%; and carbohydrate (including sugar), 25%.

EXAMPLE 4

1. Meat Slurry Preparation a. Cooking

The following ingredients are mixed in a 250 gallon, round bottom, steam-jacketed stainless steel cooking kettle, equipped with a Lightening mixer and an Automatic temperature controller.

| | Ingredients | Pounds | % (Total Product) |
|---|---|---|---|
| 1. | Water | 100 | 7.89 |
| 2. | Meats (By-Products) | 300 | 23.68 |
| 3. | Propylene Glycol | 100 | 7.89 |
| 4. | Animal Fat (or Veg. Oil) | 50 | 3.95 |
| 5. | Iodized Salt | 12 | 0.95 |
| 6. | Caramel Color | 10 | 0.79 |
| 7. | Defluorinated Calcium Phosphate | 6 | 0.47 |
| 8. | Iron Oxide (Red) | 2½ | 0.20 |
| 9. | Potassium Sorbate | 2 | 0.16 |
| 10. | Calcium Propionate | 2 | 0.16 |
| 11. | Beef Flavoring | 1 | 0.08 |
| 12. | Liquid Smoke Flavor | 4 | 0.32 |
| 13. | Vitamin Premix | 2 | 0.16 |
| 14. | Titanium Dioxide | ½ | 0.04 |
| | Total Slurry | 592 Lbs. | 46.72% |

The above meat slurry is cooked and pasteurized with continuous agitation at temperatures between 185° and 195° F. from between about 15 and 25 minutes.

b. Cooling

The hot pasteurized meat slurry is then pumped from the kettle to a cooling station where the temperature is permitted to fall to between about 50° and 70° to 75° F.

2. Dry Mix

The following dry ingredients are dry blended in a Baker-Perkins mixer of about 1500 to 1800 pound capacity.

| Ingredients | Pounds | % |
|---|---|---|
| 1. Toasted Soy Grits | 450 | 35.52 |
| 2. Cereal By-Products (15–20% sugar) | 225 | 17.76 |
| Total Dry Mix | 675 | 53.28 |
| Total Meat Slurry | 582 | 46.72 |
| Total Batch | 1267 lbs. | 100% |

3. Total Batch Preparation

The cool meat slurry is pumped over the dry mix in the Baker-Perkins mixer and the entire mixer contents are thoroughly mixed together for between about 15 and 20 minutes to produce a homogeneous blend containing between about 25 and 32% by weight moisture at a temperature of about between 50° and 75° F.

4. Extrusion

The batch of the blended admixture is passed into a compression and an extrusion chamber of a Bonnot Extruder and through a ½ inch die. The extrudate is cut into ⅜-⅝ inch lengths by a rotary knife placed at the die face. The extruded product contains between 25 and 32 percent moisture at a temperature between about 65° and 75° F.

5. External Gum Application

A 10% aqueous gum acacia solution containing from 0.20 and 0.30 percent potassium sorbate as a mold inhibitor is heated to about between 160° and 180° F. and is sprayed on the surfaces of the chunks of extruded product at a rate of about between 2 and 4% of the finished product. The chunks are tumbled during spraying to provide an even coating.

The application of gum acacia solution to the surface of the chunks of extruded product provides a very thin, uniform external film after drying.

6. Drying Process

Immediately after the application of the gum coating, the product is passed through a drying zone (70°-80° F.) to dry the coating and form an external film. The product temperature after the drying step is still essentially at ambient room temperature.

7. Packaging

After drying, the product is ready for packaging in sealed, plastic (polyethylene film) bags.

The coated product after drying contained about 30% moisture; protein, 28%; fat, 8%; propylene glycol, 8%; sugar, 3%; carbohydrate (total), 28%.

While the foregoing examples illustrate certain preferred embodiments of the process of the present invention, it is also to be understood that other modifications and variations in the method may be employed without departing from the basic scope and concept thereof. For example, as noted above, the required bacteriostasis is provided predominantly by the polyhydroxy alcohol and sugar components. It is known that either sugar or polyhydroxy alcohol may be used as bacteriostatic agents, however, it is preferred that when sugar is employed as a bacteriostatic agent that it is in a minor amount with respect to the total of bacteriostatic agent, i.e., the aggregate of polyhydroxy alcohol and sugar. The reduction of sugar results in a product which has minimal dietary tooth decay risk for pets.

The product of the process described herein, as noted above, has a normal bulk density and is not expanded or puffed during the extrusion process but is, nonetheless, soft and easily masticated by the pet and therefore appetizing and appealing.

The vegetable gum coating applied to the chunks not only enhances the appearance of the product but, in addition, provides a barrier coat which essentially stabilizes the moisture content of the individual chunks in the package to maintain the desired plasticity and softness of the chunk after the package is opened. The barrier coat also, by virtue of its containing a small amount of antimycotic, minimizes the possibility of mold or fungus growth on the surface of the chunks after they are exposed to the atmosphere or inadvertently exposed to mold spores during the packaging operations. Finally, the vegetable gum coating maintains the integrity of the individual chunks, minimizing either an agglomeration of the chunks in the package and minimizing granulation, breakage or the like of the chunks in the package during handling and prior to use by the consumer.

As noted above, the only pasteurization that is employed is with respect to the "meat slurry" which is both pasteurized and treated with the polyhydroxy alcohol and the antimycotic agents. The pasteurized meat slurry is admixed with the dry components, i.e., vegetable protein and cereal products to form a homogeneous blended product prior to extrusion. The dry blended materials are not pasteurized as such since they are incorporated after the pasteurization step and are not subjected to pasteurizing temperatures in the extrusion step. The bacteriostatic agents in the slurry are physically blended into the dry mix and by virtue of their migration into the dry mix particles extend their bacteriostatic effect to the added dry materials. Since the physical mixing is carried out in a relatively short period, the penetration of the liquids carrying the bacteriostatic agents into the dry particles of the cereal and vegetable protein component is probably not complete when the product is extruded, formed into chunks and coated. This is especially significant when the dry particulate components are hard materials that have been processed in such a way that surface bacteria are occluded within the particles during previous processing. However, the chunks when formed and coated undergo further migration of moisture and bacteriostatic agents until an equilibrium is established within each chunk and by virtue of the complete migration of bacteriostatic agents uniformly throughout the chunks, a chunk with satisfactory shelf storage properties is provided which does not require refrigeration or special packing (canning) to prevent spoilage.

In the production of intermediate moisture food products, cooking or pasteurization is customarily carried out to reduce existing bacterial populations and the bacteriostatic agents used preclude growth of residual and other adventitious contact or air borne bacteria as result from further processing.

The initial contamination of the starting materials depends in large part on their previous history. Thus, meat scraps and meat by-products are usually highly contaminated, but toasted cereal and vegetable proteins with a moisture content of 10–12% maximum have only minimal bacterial contamination. Accordingly, it has been found that it is not required that the cereal grain and vegetable protein materials be pasteurized to achieve a storage stable product, thereby resulting in a substantial savings in processing and energy costs in the production of an entirely satisfactory and acceptable product which is an important object of this invention.

Unless otherwise indicated, all percentages expressed herein are percentages by weight.

What is claimed is:

1. A method for preparing a microbiologically shelf stable extruded proteinaceous food product having a protein content of between 15 and 35% by weight, a moisture content of between about 25 and 35% by weight, a fat content of from 3 to 10%, from about 20 to 40% by weight of carbohydrates, and at least about 0.1% of an antimycotic agent in an amount sufficient to inhibit the growth of yeast or mold, from 5 to 15% by weight of polyhydroxy alcohol and a water activity ($A_W$) of between about 0.75 and 0.85 which consists of the steps of:

(a) blending and heating a mixture of water, meats, fat, salt, antimycotic agent and a polyhydroxy alcohol in an amount sufficient to produce a microbiologically shelf stable product at a temperature of at least 185° F. for a period of at least 15 minutes to pasteurize the admixture and form a homogeneous, pumpable, pasteurized slurry;

(b) cooling the slurry to essentially ambient room temperature;

(c) adding the cooled pasteurized slurry to a dry, non-pasteurized admixture of toasted particulate proteinaceous vegetable material and toasted cereal grain material components, having a maximum moisture content of 10–12% and minimal bacterial contamination said mixture containing up to 40% by weight carbohydrate, which carbohydrate consists in part of sugar, and mixing the admixture to produce a homogeneous blend containing between about 25 and 35% by weight moisture at a temperature below about 100° F.;

(d) extruding the blended product at ambient temperatures and pressures without applying heat thereto, through a die of predetermined dimensions whereby a continuous, essentially non-expanded stream of said product is formed and comminuting the extruded stream of blended product into chunks of pre-determined size and essentially normal bulk density;

(e) coating the chunks of extruded product with a coating consisting essentially of an aqueous solution of vegetable gum and at least about 0.2% of an antimycotic agent in an amount sufficient to inhibit surface growth of molds or yeasts; and (f) passing the coated chunks through a drying zone to dry the applied coating to a shiny, non-tacky finish.

2. A method according to claim 1 wherein the extruded product contains an admixture of 2–10 weight percent sugar as a part of the carbohydrate contained in said particulate proteinaceous vegetable material and cereal grain material and 5–15 weight percent polyhydroxy alcohol in a bacteriostatic amount and wherein the amount of sugar is less than the amount of polyhydroxy alcohol.

3. A method according to claim 2 wherein the polyhydroxy alcohol is present in an amount of from 5 to 10 weight percent of the final product.

4. A method according to claim 3 wherein the sugar is present in an amount of from 2% to about 6% by weight.

5. A method according to claim 1 wherein the polyhydroxy alcohol is propylene glycol.

6. A method according to claim 1 wherein the polyhydroxy alcohol is glycerol.

7. A method according to claim 1 wherein the product contains from 3 to 10 weight percent fat.

8. A method according to claim 1 wherein the proteinaceous vegetable material is toasted soya grits.

9. A method according to claim 1 where the antimycotic agent is present in amounts of from 0.1 to 0.7 weight percent.

10. A method according to claim 1 wherein the cereal grain material is a partially toasted product and contains from 15 to 20% by weight of sugar as a part of the carbohydrate contained in said particulate proteinaceous vegetable material and cereal grain material, and the overall sugar content of the final-extruded product is less than about 6 weight percent.

11. A method according to claim 1 wherein the dry particulate admixture is an admixture of from 55 to 75% by weight toasted soya grits and from 25 to 45% by weight of toasted cereal grain by-products, said admixture containing from 15 to 20% by weight sugar as a part of the carbohydrate contained in said particulate proteinaceous vegetable material and cereal grain material.

12. A method according to claim 1 wherein the chunks are coated with a hot aqueous solution containing between about 5 and 10% by weight vegetable gum and from about 0.2 to 0.3% by weight of an antimycotic agent.

13. A method according to claim 12 wherein the hot solution is at a temperature of 160°–180° F. and the vegetable gum is gum acacia.

14. A method according to claim 12 wherein the antimycotic agent is selected from the group consisting of potassium sorbate, calcium propionate or mixtures thereof.

15. A method according to claim 12 wherein the coating of the chunks by the vegetable gum solution is carried out by spraying.

16. A method according to claim 15 wherein the coating is accompanied by tumbling of the chunks to apply said coating substantially over the entire surface of the said chunks.

17. A method according to claim 1 wherein the dried, coated chunks are packaged in flexible, moisture impermeable packages.

* * * * *